US 11,888,340 B2

(12) United States Patent
Nagabhushanrao et al.

(10) Patent No.: US 11,888,340 B2
(45) Date of Patent: Jan. 30, 2024

(54) METHOD TO ENHANCE THE LIFE OF A LITHIUM BATTERY

(71) Applicant: SCHNEIDER ELECTRIC IT CORPORATION, Foxboro, MA (US)

(72) Inventors: Pradeep Tolakanahalli Nagabhushanrao, Bangalore (IN); Nagaraju Ingurthi, Bangalore (IN); Pavan Kumar Gudipalli, Bangalore (IN); Anurag Arjundas Jivanani, Groton, MA (US); Himamshu V Prasad, Tewksbury, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 462 days.

(21) Appl. No.: 17/111,594

(22) Filed: Dec. 4, 2020

(65) Prior Publication Data

US 2022/0181897 A1 Jun. 9, 2022

(51) Int. Cl.
*H02J 7/00* (2006.01)
*H02J 9/06* (2006.01)
(Continued)

(52) U.S. Cl.
CPC ........ *H02J 7/00712* (2020.01); *H02J 7/0047* (2013.01); *H02J 7/007182* (2020.01);
(Continued)

(58) Field of Classification Search
CPC ................ H02J 7/00712; H02J 7/0047; H02J 7/007182; H02J 7/007194; H02J 7/00714;
(Continued)

(56) References Cited

U.S. PATENT DOCUMENTS

| 3,235,788 | A | * | 2/1966 | Riebs | G05F 1/153 |
| | | | | | 323/257 |
| 5,373,196 | A | * | 12/1994 | Faley | H02J 9/062 |
| | | | | | 307/64 |

(Continued)

FOREIGN PATENT DOCUMENTS

| CN | 202405819 U | 8/2012 |
| CN | 103293487 B | 9/2015 |

(Continued)

OTHER PUBLICATIONS

Extended European Search Report from corresponding European Application No. 21207949.5 dated Apr. 12, 2022.

*Primary Examiner* — John T Trischler
(74) *Attorney, Agent, or Firm* — Lando & Anastasi, LLP

(57) ABSTRACT

A battery-charging system configured to charge a battery of a device to a nominal voltage includes a load-detection circuit, memory storing controller-executable instructions, and a controller configured to execute the instructions, which cause the controller to detect a load coupled to the battery above a first threshold load using the load-detection circuit, and control the battery-charging circuit to charge the battery to a high voltage in response to detecting the load above the first threshold load, wherein the high voltage is above the nominal voltage. The controller can be configured to execute other instructions, such as outputting a notification that the battery is being charged to a high voltage and/or controlling the battery-charging circuit to discharge the battery in response to detecting a reduced load or a user command.

20 Claims, 12 Drawing Sheets

(51) Int. Cl.
*G06F 1/30* (2006.01)
*G06F 1/26* (2006.01)

(52) U.S. Cl.
CPC ........ *H02J 7/007194* (2020.01); *G06F 1/263* (2013.01); *G06F 1/30* (2013.01); *G06F 1/305* (2013.01); *H02J 7/00714* (2020.01); *H02J 7/007192* (2020.01); *H02J 9/06* (2013.01)

(58) Field of Classification Search
CPC ....... H02J 7/007192; H02J 9/06; G06F 1/263; G06F 1/30
USPC .......................................................... 320/134
See application file for complete search history.

(56) References Cited

U.S. PATENT DOCUMENTS

| | | | | |
|---|---|---|---|---|
| 5,939,864 | A * | 8/1999 | Lenhart | H02J 7/0071 429/50 |
| 6,184,659 | B1 * | 2/2001 | Darmawaskita | H02J 7/00712 320/137 |
| 6,456,044 | B1 * | 9/2002 | Darmawaskita | H02J 7/00712 320/137 |
| 6,479,970 | B2 * | 11/2002 | Reddy | H02J 9/062 307/66 |
| 6,577,103 | B2 * | 6/2003 | Tanaka | H02J 9/061 307/66 |
| 6,911,804 | B2 * | 6/2005 | Mori | G06F 1/263 320/132 |
| 6,917,124 | B2 * | 7/2005 | Shetler, Jr. | H02J 9/061 307/66 |
| 7,453,267 | B2 * | 11/2008 | Westbrock, Jr. | H02H 3/006 324/522 |
| 8,362,643 | B2 * | 1/2013 | Luo | H02J 3/32 307/46 |
| 8,478,452 | B2 * | 7/2013 | Pratt | B60L 53/63 700/297 |
| 8,700,225 | B2 * | 4/2014 | Pratt | B60L 53/63 700/297 |
| 9,143,005 | B1 * | 9/2015 | Laird | H02J 9/00 |
| 9,172,247 | B2 * | 10/2015 | Iwasaki | H02J 3/322 |
| 9,184,627 | B2 * | 11/2015 | Huang | H02J 7/35 |
| 9,285,429 | B2 * | 3/2016 | Andersson | G01R 31/382 |
| 9,350,190 | B2 * | 5/2016 | Iwamoto | H02J 7/0069 |
| 9,527,400 | B2 * | 12/2016 | Rhodes | B60L 15/2045 |
| 9,531,201 | B2 * | 12/2016 | Noh | H02J 7/00047 |
| 9,753,440 | B2 * | 9/2017 | Pratt | B60L 53/68 |
| 9,787,133 | B2 * | 10/2017 | Liang | H02M 7/08 |
| 9,831,717 | B2 * | 11/2017 | Kanakasabai | H02J 9/062 |
| 9,882,423 | B2 * | 1/2018 | Olsen | H02M 1/42 |
| 9,985,470 | B2 * | 5/2018 | Paatero | H02M 7/04 |
| 10,195,948 | B2 * | 2/2019 | O'Hara | B60L 58/15 |
| 10,223,156 | B2 * | 3/2019 | Chan | G06F 1/3206 |
| 10,259,335 | B2 * | 4/2019 | Endo | B60L 58/12 |
| 10,418,819 | B2 * | 9/2019 | Nishigai | H02M 7/44 |
| 10,447,056 | B2 * | 10/2019 | Tamburrino | H02J 7/00712 |
| 10,566,811 | B2 * | 2/2020 | Howey | H01M 10/42 |
| 10,663,932 | B2 * | 5/2020 | Pratt | B60L 58/13 |
| 10,811,898 | B2 * | 10/2020 | Toyoda | H02M 3/33584 |
| 10,958,082 | B2 * | 3/2021 | Solomon | H02J 7/00 |
| 11,121,554 | B2 * | 9/2021 | Kato | H02J 7/35 |
| 11,196,274 | B2 * | 12/2021 | Ambriz Rios | H02J 7/00 |
| 11,283,285 | B2 * | 3/2022 | Nagabhushanrao | H02J 9/062 |
| 11,283,288 | B2 * | 3/2022 | Nagabhushanrao | H02M 1/4208 |
| 11,381,107 | B2 * | 7/2022 | Jayaraman | H02J 7/00712 |
| 11,387,670 | B2 * | 7/2022 | Nagabhushanrao | H02M 5/4585 |
| 11,563,332 | B2 * | 1/2023 | Ambriz Rios | H02J 7/0045 |
| 11,575,276 | B2 * | 2/2023 | Nagabhushanrao | H02J 9/062 |
| 11,611,232 | B2 * | 3/2023 | Jayaraman | H02J 9/062 |
| 11,621,579 | B2 * | 4/2023 | Nagabhushanrao | H02M 3/158 307/66 |
| 2001/0048286 | A1 * | 12/2001 | Tanaka | H02J 9/061 320/116 |
| 2002/0140403 | A1 * | 10/2002 | Reddy | H02J 9/062 320/162 |
| 2002/0186576 | A1 * | 12/2002 | Kanouda | H02J 9/061 363/125 |
| 2003/0048006 | A1 | 3/2003 | Shelter et al. | |
| 2004/0066171 | A1 * | 4/2004 | Mori | G06F 1/28 320/132 |
| 2006/0238932 | A1 * | 10/2006 | Westbrock, Jr. | H02H 1/0061 361/42 |
| 2010/0164439 | A1 * | 7/2010 | Ido | H02J 7/007182 320/155 |
| 2011/0175576 | A1 * | 7/2011 | Uesaka | H02J 7/0048 320/155 |
| 2011/0193522 | A1 * | 8/2011 | Uesugi | B60L 53/65 320/109 |
| 2011/0245987 | A1 * | 10/2011 | Pratt | G05B 15/02 320/132 |
| 2014/0184137 | A1 * | 7/2014 | Huang | H02J 7/00712 320/101 |
| 2014/0253049 | A1 * | 9/2014 | Iwamoto | H02J 7/0069 320/162 |
| 2014/0366042 | A1 * | 12/2014 | Chan | G06F 1/3212 719/318 |
| 2015/0048803 | A1 * | 2/2015 | Noh | H02J 7/00047 320/155 |
| 2015/0076915 | A1 * | 3/2015 | Liang | H02M 7/08 307/66 |
| 2016/0221456 | A1 * | 8/2016 | Rhodes | B60L 15/2045 |
| 2016/0276870 | A1 | 9/2016 | Olsen | |
| 2016/0344232 | A1 * | 11/2016 | Paatero | H02J 9/06 |
| 2017/0008416 | A1 * | 1/2017 | Endo | B60L 53/305 |
| 2017/0077746 | A1 * | 3/2017 | Kanakasabai | H02J 7/0068 |
| 2017/0133863 | A1 * | 5/2017 | Tamburrino | H02J 7/0014 |
| 2017/0222437 | A1 * | 8/2017 | Pratt | B60L 58/13 |
| 2018/0022226 | A1 * | 1/2018 | Sjodin | B60L 58/15 701/22 |
| 2018/0097364 | A1 * | 4/2018 | Kato | H02J 7/35 |
| 2018/0141444 | A1 * | 5/2018 | Lee | B60L 53/122 |
| 2018/0198300 | A1 * | 7/2018 | Howey | H01M 10/045 |
| 2018/0257492 | A1 * | 9/2018 | O'Hara | H01M 10/0525 |
| 2019/0181677 | A1 | 6/2019 | Toyoda | |
| 2019/0230985 | A1 * | 8/2019 | Chan | H02J 7/0044 |
| 2019/0305574 | A1 * | 10/2019 | Matsumura | H02J 7/007184 |
| 2019/0317800 | A1 * | 10/2019 | Chan | G06F 1/3212 |
| 2019/0334353 | A1 * | 10/2019 | Solomon | G06Q 10/04 |
| 2020/0006980 | A1 * | 1/2020 | Tolakanahalli | H02M 1/4225 |
| 2020/0153253 | A1 * | 5/2020 | Tamburrino | H01M 6/5033 |
| 2020/0358302 | A1 * | 11/2020 | Kramar | G06F 1/263 |
| 2021/0194274 | A1 * | 6/2021 | Nagabhushanrao | H02J 9/062 |
| 2021/0194276 | A1 * | 6/2021 | Jayaraman | H02J 7/00712 |
| 2021/0194366 | A1 * | 6/2021 | Thatte | H03K 19/0016 |
| 2021/0249899 | A1 * | 8/2021 | Nagabhushanrao | H02M 1/14 |
| 2022/0069365 | A1 * | 3/2022 | Ingurthi | H02J 7/007182 |
| 2022/0069599 | A1 * | 3/2022 | Ambriz Rios | H02J 7/342 |
| 2022/0181905 | A1 * | 6/2022 | Agrawal | H02J 9/068 |
| 2022/0224143 | A1 * | 7/2022 | Suresh | H02J 9/062 |
| 2022/0224150 | A1 * | 7/2022 | August | H02J 3/004 |
| 2022/0239143 | A1 * | 7/2022 | Nagabhushanrao | H02J 9/062 |
| 2022/0247196 | A1 * | 8/2022 | Syed | H01M 10/44 |
| 2022/0302747 | A1 * | 9/2022 | Colby, Jr. | H02J 9/062 |
| 2022/0302748 | A1 * | 9/2022 | Jayaraman | H02J 9/062 |
| 2022/0399745 | A1 * | 12/2022 | Nagabhushanrao | H02M 3/158 |
| 2022/0399751 | A1 * | 12/2022 | Peramsetty | H02M 3/1582 |

FOREIGN PATENT DOCUMENTS

| | | | |
|---|---|---|---|
| CN | 110165880 A | * | 8/2019 |
| EP | 2904678 A1 | | 8/2015 |
| WO | 2014053464 A1 | | 4/2014 |

* cited by examiner

| | VTC4 | VTC5D |
|---|---|---|
| 4.20V | 0.4 years | 3.4 years |
| 4.10V | 9.9 years | 7.6 years |
| 4.00V | ≥13.9 years | ≥9.1 years |

| % Load | Charging voltage | Backup time With 4.2 V/Cell | Calendar Life | Cycle Life |
|---|---|---|---|---|
| 100% | 4.2 | 23 | 0.4 | 1000 |
| 90% | 4.2 | 25 | 0.4 | 1000 |
| 80% | 4.2 | 29 | 0.4 | 1000 |
| 70% | 4.2 | 33 | 0.4 | 1000 |
| 60% | 4.2 | 38 | 0.4 | 1000 |
| 50% | 4.2 | 46 | 0.4 | 1000 |

| % Load | Battery Voltage | Backup time | Calendar Life | Cycle Life |
|---|---|---|---|---|
| 100% | 4.2 | 23 | 0.4 | 1000 |
| 90% | 4.15 | 24 | 6 | 1500 |
| 80% | 4.1 | 26 | 9.9 | 2000 |
| 70% | 4.05 | 28 | 11 | 2500 |
| 60% | 4 | 30 | 13.9 | 3500 |
| 50% | 4 | 37 | 13.9 | 3500 |

FIG. 5

METHOD TO ENHANCE THE LIFE OF A LITHIUM BATTERY

BACKGROUND OF DISCLOSURE

1. Field of Disclosure

This disclosure is directed to systems and methods of enhancing the life of a battery, particularly a lithium-ion battery that is used in a device.

2. Discussion of Related Art

Lithium-ion batteries are becoming increasingly used in end-user applications due to their benefits over other types of batteries, such as lead acid batteries. The benefits afforded by lithium-ion batteries include low maintenance, lightweight, and high energy storage potential. Lithium-ion batteries offer much longer life compared to traditional lead acid batteries. The adaptation of lithium-ion batteries in an uninterruptible power supply (UPS) application is gaining popularity due to their inherent benefits over the conventional lead acid batteries.

SUMMARY OF DISCLOSURE

One aspect of the present disclosure is directed to a battery-charging system configured to charge a battery of a device to a nominal voltage. In one embodiment, the battery-charging system comprises a battery-charging circuit, a load-detection circuit, memory storing controller-executable instructions, and a controller configured to execute the instructions, which cause the controller to detect a load coupled to the battery above a first threshold load using the load-detection circuit, and control the battery-charging circuit to charge the battery to a high voltage in response to detecting the load above the first threshold load, wherein the high voltage is above the nominal voltage.

Embodiments of the battery-charging system further may include configuring the controller to output a notification that the battery is being charged to the high voltage. The controller further may be configured to control the battery-charging circuit to discharge the battery in response to detecting a reduced load. The reduced load may be below a second threshold load. The controller further may be configured to control the battery-charging circuit to discharge the battery in response to a user command. The controller further may be configured to detect a load below the first threshold load using the load-detection circuit, and control the battery-charging circuit to charge the battery to the nominal voltage in response to detecting a load below the first threshold load. The controller further may be configured to control the battery-charging circuit to charge the battery to either a high voltage or a nominal voltage based on one or more operating parameters. The one or more operating parameters may include at least one of load voltage, load current, load power or battery temperature.

Another aspect of the present disclosure is directed to a battery-charging system configured to charge a battery of a device to a nominal voltage. In one embodiment, the battery-charging system comprises a battery-charging circuit, a load-detection circuit, memory storing controller-executable instructions, and a controller configured to execute the instructions, which cause the controller to receive a user command to charge the battery to a high voltage, wherein the high voltage is above the nominal voltage, and control the battery-charging circuit to charge the battery to the high voltage in response to the user command to charge the battery to the high voltage.

Embodiments of the battery-charging system further may include configuring the controller to resume controlling the battery-charging circuit to charge the battery to the nominal voltage in response to another user command. The controller further may be configured to control the battery-charging circuit to charge the battery to either a high voltage or a nominal voltage based on one or more operating parameters. The one or more operating parameters may include at least one of load voltage, load current, load power or battery temperature. The controller further may be configured to output a notification of an increased load coupled to the battery, wherein the increased load is above a threshold load. The controller further may be configured to output a notification of a decreased load coupled to the battery, wherein the decreased load is below a threshold load.

Yet another aspect of the present disclosure is directed to one or more non-transitory machine-readable media storing instructions that, when executed by one or more processors, cause the one or more processors to detect a load coupled to a battery above a first threshold load using a load-detection circuit, and control a battery-charging circuit to charge the battery to a high voltage in response to detecting a load above the first threshold load, wherein the high voltage is above a nominal voltage.

Embodiments of the one or more non-transitory machine-readable media storing instructions that, when executed, further cause the one or more processors to perform one or more of the following actions: detect a load below the first threshold load using the load-detection circuit, and control the battery-charging circuit to charge the battery to the nominal voltage in response to detecting a load below the first threshold load; or control the battery-charging circuit to charge the battery to either a high voltage or a nominal voltage based on one or more operating parameters. The one or more operating parameters may include at least one of load voltage, load current, load power or battery temperature.

Another aspect of the present disclosure is directed to one or more non-transitory machine-readable media storing instructions that, when executed by one or more processors, cause the one or more processors to receive a user command to charge a battery to a high voltage, wherein the high voltage is above a nominal voltage, and control a battery-charging circuit to charge the battery to the high voltage in response to the user command to charge the battery to the high voltage.

Embodiments of the one or more non-transitory machine-readable media storing instructions that, when executed, further cause the one or more processors to perform one or more of the following actions: resume controlling the battery-charging circuit to charge the battery to the nominal voltage in response to another user command; output a notification of an increased load coupled to the battery, wherein the increased load is above a threshold load; or output a notification of a decreased load coupled to the battery, wherein the decreased load is below a threshold load.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a look-up table showing back-up time and life estimates taken from battery characteristic information provided by a vendor.

DETAILED DESCRIPTION

Figures 1, 2:
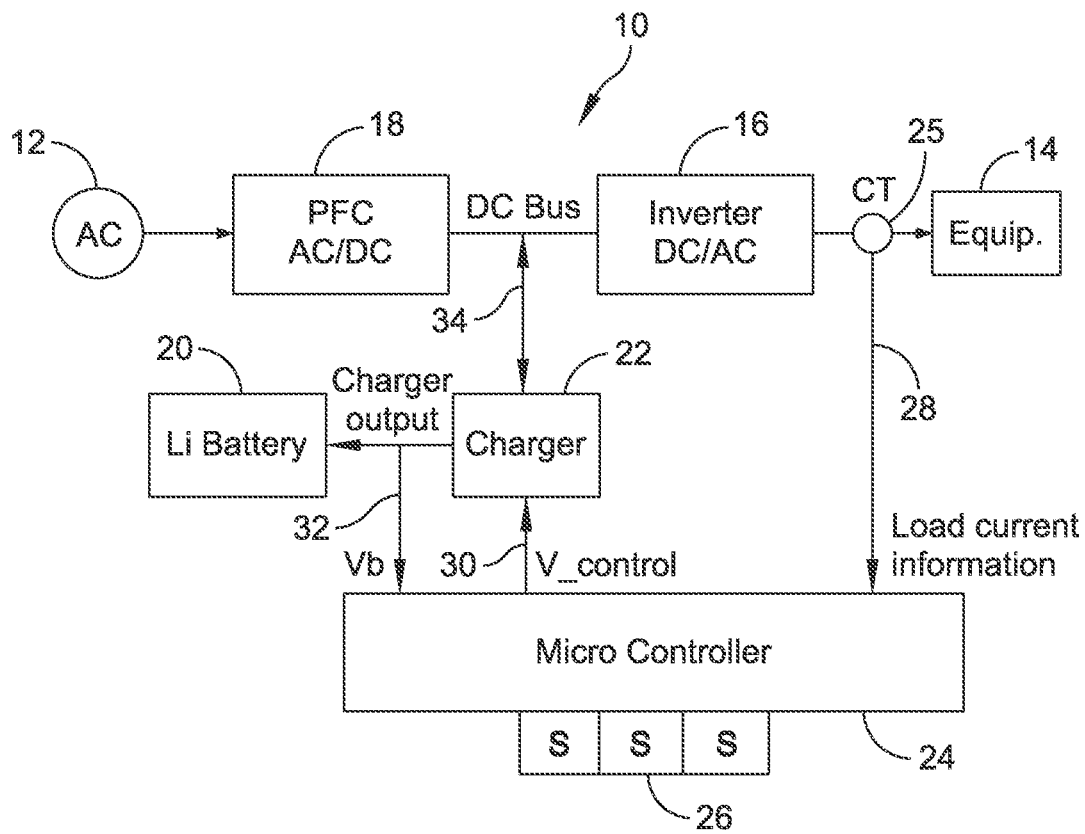
FIG. 1 is a schematic view of an uninterruptible power supply (UPS) system configured to enhance the life of a lithium-ion battery.
FIG. 2 is a table showing a calendar life of a typical lithium-ion battery with respect the charging voltage.

One factor in the selection of a UPS is the cost, back-up time, and the life of the battery. Also, it is a common practice to specify the back-up time with 100% load on the battery. The life of the battery is solely determined by the retention capacity over its useful life. When the retention capacity of the battery drops to 60%, it is considered to be the end of life. The life of lithium-ion batteries is extremely sensitive to the operating conditions. Operating temperature and the charging voltage are the two dominant factors that may determine the useful life of the battery. These factors affect both calendar life and the cyclic life of these batteries. A challenge today is to design a battery system that offer the required back-up time and the expected life of the battery at the lowest cost. The life of the battery is associated with warranty claims and the associated warranty costs as well.

Embodiments of the present disclosure are directed to a battery-charging system that is configured to charge a battery to a desired voltage, including a nominal voltage and a high voltage. In one embodiment, the battery-charging system includes a battery-charging circuit, a load-detection circuit, and a processor and memory to operate the system. The processor and memory are configured to detect a load from electronic equipment above a threshold load using the load-detection circuit and to control the battery-charging circuit to charge the battery to a high voltage in response to detecting the load above the threshold load. The high voltage is above the nominal voltage. The processor and memory further are configured to detect a load below the threshold load using the load-detection circuit and to control the battery-charging circuit to charge the battery to a different charging voltage in response to detecting a load below the threshold load.

In one embodiment, the battery-charging system is part of a power device, such as an uninterruptible power supply (UPS). However, the concepts disclosed herein can be applied to any type of power device that includes an internal or an external battery.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items. When specific dimensions, quantities or magnitudes are provided they should be considered in reference to the specific embodiment referenced as they may be scaled to suit other embodiments.

Referring to FIG. 1, in one embodiment, a UPS, which is generally indicated at 10, is coupled to an alternating current power supply 12 and a load at 14, which may include electronic equipment housed within an equipment rack. As used herein, "load" refers to the electronic equipment that is powered from the UPS 10. As shown, the UPS 10 includes an inverter 16 configured to convert direct current (DC) to alternating current (AC) and a power factor controller (PFC) 18 configured to convert input AC to DC and to provide power factor correction for the UPS. The UPS 10 further includes a battery 20, which in the shown embodiment is a lithium-ion battery, that is coupled to the inverter 16 by a charger/DC-DC converter 22. The UPS 10 further includes a microcontroller 24 that controls the operation of the constituent parts of the UPS. The UPS 10 also includes a current transformer 25 coupled to the microcontroller. In one embodiment, the microcontroller 24 embodies a small computer on an integrated circuit (IC) chip and may contain one or more central processing units (CPUs) along with memory and programmable inputs and outputs. The program memory can be on chip.

Various controllers, such as the microcontroller 24, may execute various operations discussed herein. Using data stored in associated memory and/or storage, the controllers may also execute one or more instructions stored on one or more non-transitory computer-readable media that may result in manipulated data. In some examples, the controllers may include one or more processors or other types of controllers. In one example, the controllers are or include a commercially available, general-purpose processor. In another example, the controllers perform at least a portion of the operations discussed above using an application-specific integrated circuit tailored to perform particular operations in addition to, or in lieu of, a general-purpose processor. As illustrated by these examples, examples in accordance with the present invention may perform the operations described herein using many specific combinations of hardware and software and the invention is not limited to any particular combination of hardware and software components.

In the shown embodiment, the UPS 10 is configured as an online UPS. When loss or degradation of AC power occurs, power to the load continues from the battery 20 through the charger 22, which in one embodiment functions as a DC/DC converter in battery mode of operation to convert the DC voltage of the battery to the voltage of the DC bus. In another embodiment, the battery 20 may be directly coupled to the DC bus in battery mode. In yet in another embodiment, the battery 20 may be coupled to the PFC 18, which is configured to convert the DC voltage of the battery to the DC voltage of the DC bus. When AC power is restored, the UPS 10 provides output AC power from the input AC power through the PFC 18 and the inverter 16. Although an online UPS is shown, embodiments described herein can be used with other types of UPSs, including off-line UPSs or any other system that incorporates a battery and a charger.

In one embodiment, output voltage and current to the battery 20 from the charger 22 are controlled by the microcontroller 24. The microcontroller 24 includes one or more sensors, together indicated at 26, that along with the current transformer 25, ae configured to measure parameters associated with the UPS 10 and the load at 14, such as voltage, current, and/or power. The microcontroller 24 is connected to the inverter 16 and the load by connection 28, to the charger by connection 30, and to the battery 20 and the charger 22 by connection 32. The microcontroller 24 and associated memory further includes at least one look-up table that contains information of battery characteristics and algorithms to perform the methods described herein. The inverter 16 and the PFC 18 are connected to the charger 22 by connection 34. Embodiments of the present disclosure are directed to a system of controlling a charging voltage from the charger 22 to the battery 20 based on the UPS load to extend the life of the battery. In embodiments described herein, the term UPS load refers to at least one of the power and the current delivered from the UPS 10 to the load.

A typical UPS is often operated at a load that is less than the UPS's specified full load. For a typical UPS, it is common practice to specify a back-up time of the UPS when operated at full load. The operating load on a UPS system typically varies from 50 to 70% of the full specified load of the UPS. The systems and methods described herein leverage the information about field operating conditions, which are conducive to enhance the life of the battery without compromising on the rated conditions of the UPS. At least some systems and methods described herein assist in achieving performance parameters including rated performance specifications, desired back-up time at rated operating conditions, desired retention capacity of the battery during warranty/useful life of the battery, a reduction in-warranty costs, and a lowest cost of operation.

In one embodiment, a system and method are configured to dynamically adjust a voltage setting of the charger 22 for charging the battery 20 based on the load on the UPS. More specifically, the charge voltage of the battery 20 is lower for loads less than the specified full load of the UPS 10.

In another embodiment, the system and method are configured to a adjust the voltage setting of the charger 22 based on a user command. The microcontroller 24 is configured to receive the command and adjust or change the charging voltage to maximize the life of the battery 20.

Figures 3, 4:
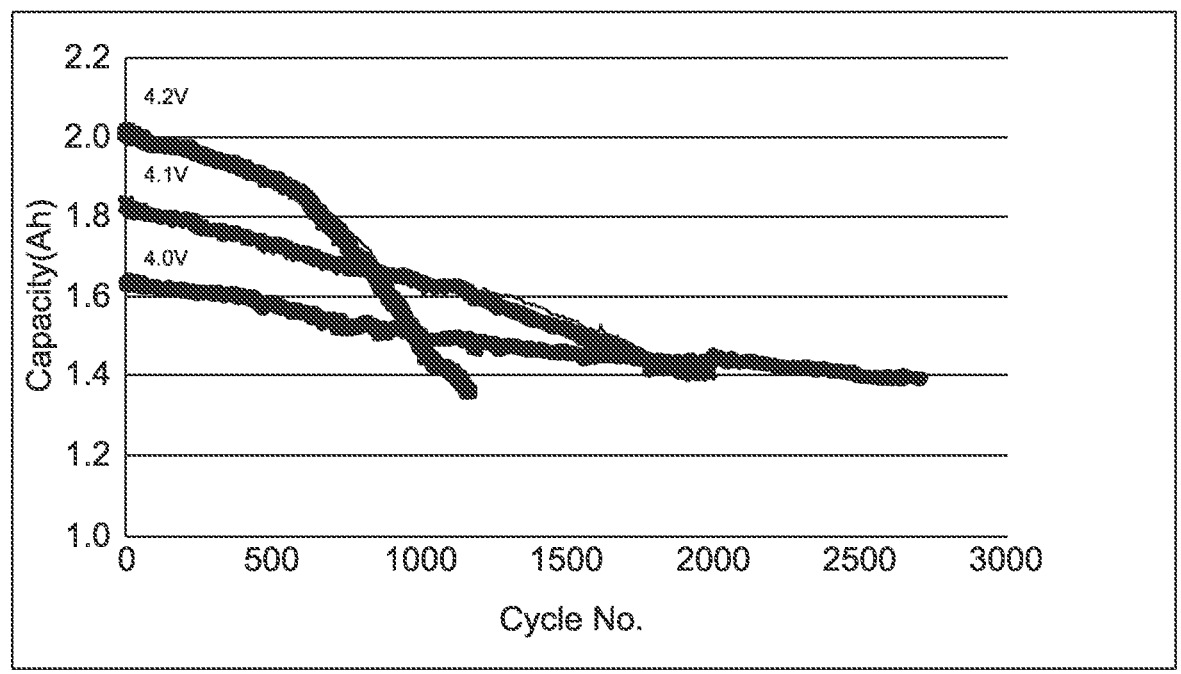
FIG. 3 is a graph showing a cyclic life of a typical lithium-ion battery.
FIG. 4 is a table showing back-up time and life estimates with an existing approach to measuring back-up time and life estimates.

Referring to FIGS. 2 and 3, a calendar life and a cyclic life of a typical lithium-ion battery with respect to the charging voltage are respectively illustrated. As shown in FIGS. 2 and 3, the life of the lithium-ion battery is sensitive to a charging voltage. A marginal reduction in charging voltage can enhance the life of the lithium-ion battery substantially. FIGS. 2 and 3 illustrate a substantial increase in life of the lithium-ion battery by reducing voltage of the lithium-ion battery from 4.20 volts (V) to 4.10 V and from 4.10 V to 4.00 V. However, it should be noted that this may result in a drop in the back-up time at the full load conditions.

Embodiments of the method described herein are demonstrated through a practical example of a 1.5 k VA UPS with a lithium-ion battery. As shown in FIG. 2, the selected cell types are NMC type VTC4 cell and VTCSD cell from Murata Manufacturing Co., Ltd. of Kyoto, Japan, formerly Sony Energy Devices Corporation. In one embodiment, the current interrupt device (CID) is a fuse-type device that cuts off the electrical circuit permanently when triggered by excessive cell pressure, high temperature. The concepts described herein apply to other UPS and battery combinations.

Referring to FIG. 4, the back-up time and life estimates associated with an existing approach are shown and described by the table illustrated therein. With prior known methods, the charging voltage is maintained constant under all load conditions.

In the systems and methods described herein, the load power information is used to set the charging voltage without compromising on the full load performance. This method is implemented through use of a look-up table shown in FIG. 5, which is derived from the battery characteristic information provided by the battery vendors, e.g., the information shown for the lithium-ion battery 20 shown in FIGS. 2 and 3. It should be noted that a back time and calendar life estimates are derived from the information contained in FIGS. 2 and 3. This is an approximate estimate.

In one embodiment, an exemplary battery-charging system, which is configured to charge the lithium-ion battery 20 to a nominal voltage, includes the charger 22, the sensors 25, 26, and the microcontroller 24 described above. The microcontroller 24 is configured to detect the UPS load based on the output power and/or current of the UPS at 14. The predetermined threshold load can be based on a maximum voltage produced by the lithium-ion battery 20. The microcontroller 24 further is configured to control the charger 22 to charge the lithium-ion battery 20 to a high voltage in response to detecting the load at 14 above the threshold load, it being understood that the high voltage is above the nominal voltage. The microcontroller 24 further is configured to detect the load at 14 below the threshold load and to control the battery-charging circuit and the charger 22 to charge the lithium-ion battery 20 to the appropriate charging voltage in response to detecting a load below the threshold load.

Figure 6:
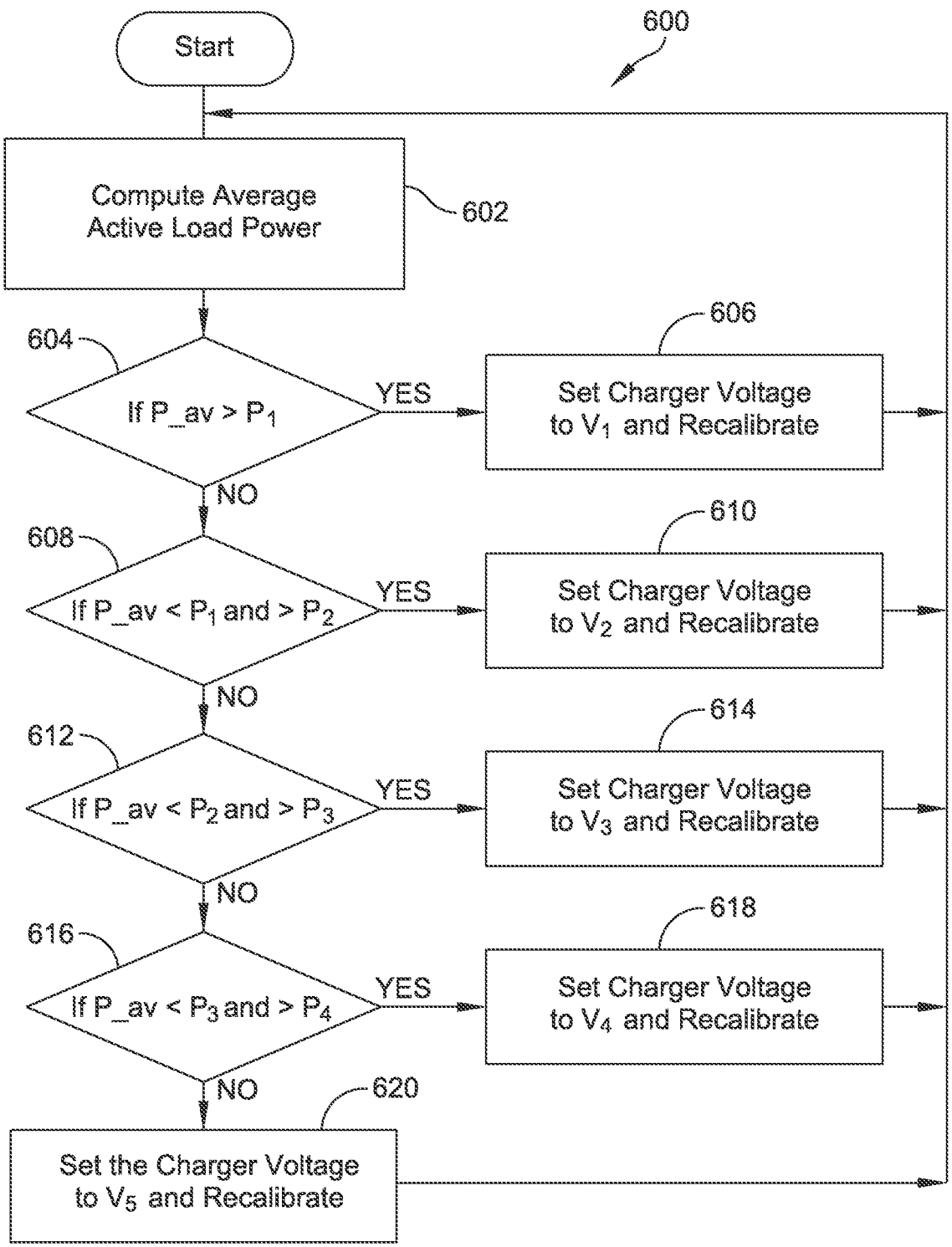
FIG. 6 is a flow diagram of a look-up table selection algorithm of an embodiment of the present disclosure.

Referring to FIG. 6, an algorithm used to maximize the life of a lithium-ion battery is generally indicated at 600. The load on the UPS 10 is sensed through a current sensor 26 and a voltage sensor 26 and this information is passed on to the microcontroller 24. The algorithm running in the microcontroller 24 can estimate the active power delivered by the UPS 10 to the load. At step 702, the algorithm computes an average power (P_av) over a time (T_av). In this example, the average time (T_av) is 24 hours. In one example, the load power is sampled periodically, e.g., every Ts seconds. Periodic sampling (Ts) in this example is assumed to be 60 seconds. Thus, the average power (P_av) is computed using the moving averaging method or any other suitable method that will help to estimate the average power. This computed average power is used to set the voltage (Vchg) of the charger 22, according to the look-up table shown in FIG. 5. This approach will help to maximize the life of the battery with a moderate compromise on the back-up time delivered to the load for loads below the 100% rated loads.

For example, at decision 604, if the average active load power (P_av) is greater than a first pre-set average $P_1$ (e.g., 90%), then the charger voltage is set to a first pre-set voltage $V_1$ (e.g., 4.2 V/cell) at 606, with the algorithm being recalibrated to 100% of the state of charge (SOC) with respect to the first pre-set voltage $V_1$.

At decision 608, if the average active load power (P_av) is greater than a second pre-set average $P_2$ (e.g., 80%) and less than the first pre-set average $P_1$ (e.g., 90%), then the charger voltage is set to a second pre-set voltage $V_2$ (e.g., 4.15 V/cell) at 610, with the algorithm being recalibrated to 100% of the state of charge (SOC) with respect to the second pre-set voltage $V_2$.

At decision 612, if the average active load power (P_av) is greater than a third pre-set average $P_3$ (e.g., 70%) and less than the second pre-set average $P_2$ (e.g., 80%), then the charger voltage is set to a third pre-set voltage $V_3$ (e.g., 4.10 V/cell) at 614, with the algorithm being recalibrated to 100% of the state of charge with respect to the third pre-set voltage $V_3$.

At decision 616, if the average active load power (P_av) is greater than a fourth pre-set average $P_4$ (e.g., 60%) and less than the third pre-set average $P_3$ (e.g., 70%), then the charger voltage is set to a fourth pre-set voltage $V_4$ (e.g., 4.05 V/cell) at 618, with the algorithm being recalibrated to 100% of the state of charge with respect to the fourth present voltage $V_4$.

If the average active load power (P_av) is less than the fourth pre-set average $P_4$ (e.g., 60%), then the charger voltage is set to a fifth pre-set voltage $V_5$ (e.g., 4.00 V/cell) at 620, with the algorithm being recalibrated to 100% of the state of charge with respect to fifth pre-set voltage $V_5$.

In addition, an algorithm may be employed to recalibrate state of charge appropriate to revised charging voltages. Additionally, the life the battery 20 and the back-up time further may be optimized by taking the following conditions into consideration. The voltage setting of the charger 22 can be based on the various dynamics, such as peak demand, average power demand during the peak working hours of the day or any other criteria depending on the application needs. The voltage setting of the charger 22 further can be based on environmental conditions, e.g., operating temperature, the state of health of the battery 20, e.g., elapsed cycle life or calendar life, and individual cell information to adjust to the weakest cell in the system.

Figure 7:
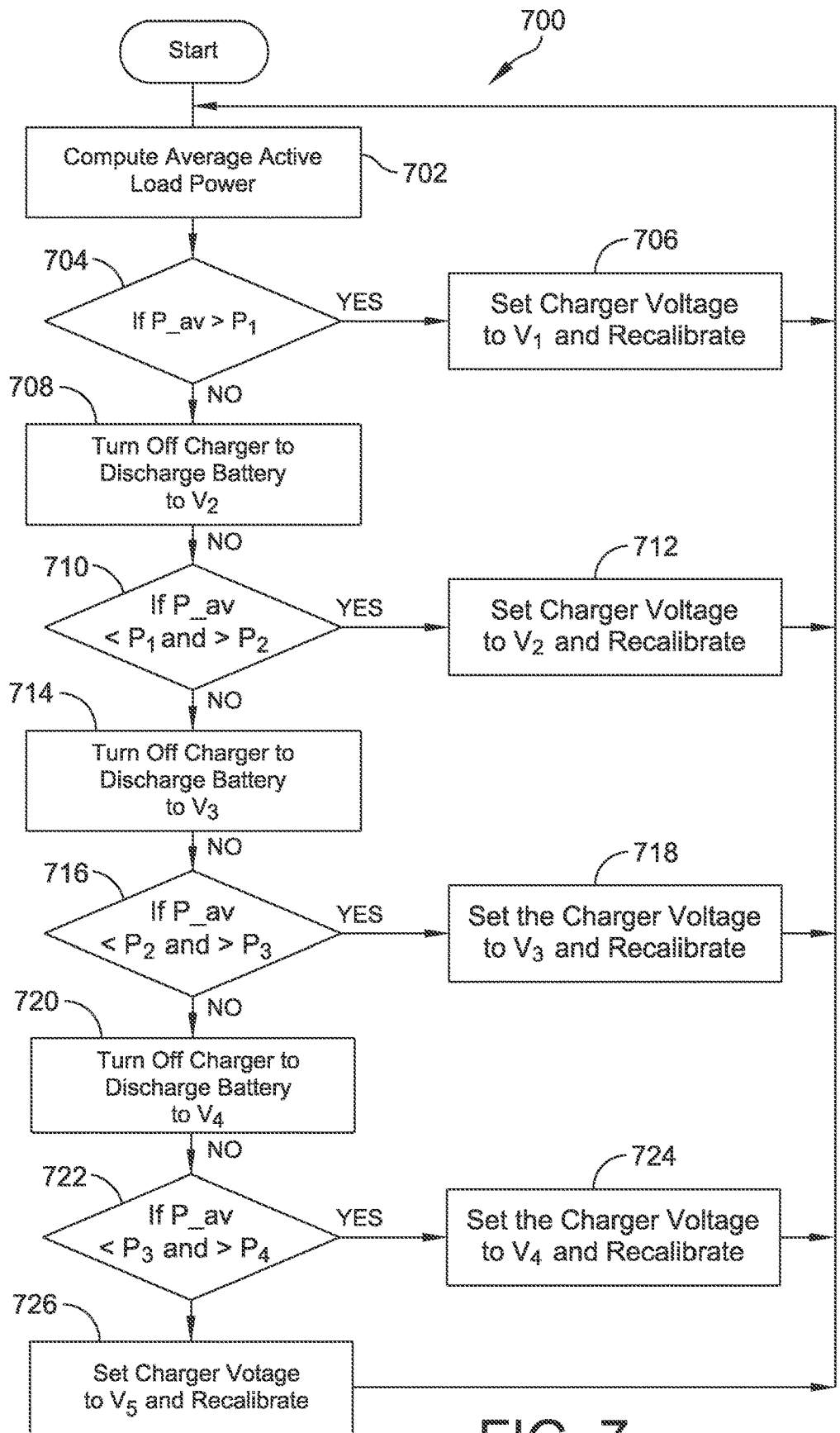
FIG. 7 is a flow diagram of a look-up table selection algorithm of another embodiment of the present disclosure.

Referring to FIG. 7, another embodiment of an algorithm used to maximize the life of a lithium-ion battery is generally indicated at 700. At step 702, the algorithm computes an average power (P_av) over a time (T_av). In this example, the average time (T_av) is 24 hours. In one example, the load power is sampled periodically, e.g., every Ts seconds. Periodic sampling (Ts) in this example is assumed to be 60 seconds. Thus, the average power (P_av) is computed using the moving averaging method or any other suitable method that will help to estimate the average power.

In the shown example, when the algorithm detects the load (e.g., load) is 100%, the charger voltage is set to a maximum voltage (e.g., 4.2 V) as per the look up table shown in FIG. 5. This charger setting of the charger (e.g., charger 22) will charge the battery (e.g., battery 20) to the maximum voltage (e.g., 4.2 Volt/cell). If there is a drop in the connected load (for example <80%) the new optimum charger voltage according to the table 5 is a lower voltage (e.g., 4.1 V/cell). However, this change in charger voltage will not be effective since the battery is already charged to the maximum voltage. The enhanced algorithm of embodiments of the present disclosure will readjust the battery voltage that corresponds to the present load (e.g., less than 80%) by partially discharging the battery to new operating conditions. This method will avoid prolonged exposure of the lithium-ion battery to higher voltage when the operating conditions are conducive for battery life optimization.

For example, at decision 704, if the average active load power (P_av) is greater than a first pre-set average $P_1$ (e.g., 90%), then the charger voltage is set to a first pre-set voltage $V_1$ (e.g., 4.2 V/cell) at 706, with the algorithm being recalibrated to 100% of the state of charge with respect to the first pre-set voltage $V_1$.

If the average active load power (P_av) is less than the first pre-set average $P_1$ (e.g., 90%), then the charger is turned off at 708 to allow the battery to discharge and reach a second pre-set voltage $V_2$ (e.g., 4.15 V/cell). At decision 710, if the average active load power (P_av) is greater than a second pre-set average $P_2$ (e.g., 80%) and less than the first pre-set average $P_1$ (e.g., 90%), then the charger voltage is set to a second pre-set voltage $V_2$ (e.g., 4.15 V/cell) at 712, with the algorithm being recalibrated to 100% of the state of charge with respect to the second pre-set voltage $V_2$.

If the average active load power (P_av) is less than the second pre-set average $P_2$ (e.g., 80%), then the charger is turned off at 714 to allow the battery to discharge and reach a third pre-set voltage $V_3$ (e.g., 4.10 V/cell). At decision 716, if the average active load power (P_av) is greater than a third pre-set average $P_3$ (e.g., 70%) and less than the second pre-set average $P_2$ (e.g., 80%), then the charger voltage is set to a third pre-set voltage $V_3$ (e.g., 4.10 V/cell) at 718, with the algorithm being recalibrated to 100% of the state of charge with respect to the third pre-set voltage $V_3$.

If the average active load power (P_av) is less than the third pre-set average $P_3$ (e.g., 70%), then the charger is turned off at 720 to allow the battery to discharge and reach a fourth pre-set voltage $V_4$ (e.g., 4.05 V/cell). At decision 722, if the average active load power (P_av) is greater than a fourth pre-set average $P_4$ (e.g., 60%) and less than the third pre-set average $P_3$ (e.g., 70%), then the charger voltage is set to a fourth pre-set voltage $V_4$ (e.g., 4.05 V/cell) at 724, with the algorithm being recalibrated to 100% of the state of charge with respect to the fourth pre-set voltage $V_4$.

If the average active load power (P_av) is less than the fourth pre-set average $P_4$ (e.g., 60%), then the charger voltage is set to a fifth pre-set voltage $V_5$ (e.g., 4.00 V/cell) at 726, with the algorithm being recalibrated to 100% of the state of charge (SOC) with respect to the fifth pre-set voltage $V_5$.

The systems and methods disclosed herein can be configured to operate the microcontroller 24 in one of three modes of operation. In a first mode of operation, the microcontroller 24 is configured to operate in a default mode in which the lithium-ion battery 20 is charged by the charger 22 to a high (maximum) voltage if the load is high or based on a user request. The default mode of operation as the name implies can be a normal operation of the microcontroller 24. Specifically, the battery charging system is configured to detect the load above a first threshold load and to control the charger 22 to charge the battery 20 to the high voltage, with the high voltage being higher than a nominal voltage to which the battery is typically charged.

In some embodiments, the microcontroller 24 is configured to output a notification that the battery 20 is being charged to the high voltage. This notification can be visual as on a display associated with the microcontroller 24 or audible as in the form of an alarm. The notification can include an option to send a command to charge the battery 20 to the high voltage.

In some embodiments, the microcontroller 24 is configured to control the charger 22 to discharge the battery 20 in response to detecting a reduced load.

In some embodiments, the reduced load is below a second threshold load, which may be the same as the first threshold load.

In some embodiments, the microcontroller 24 is configured to control the charger 22 to discharge the battery 20 in response to a user command.

In some embodiments, the microcontroller 24 is configured to detect the load at 14 below the first threshold load using microcontroller, and control the charger 22 to charge the battery with charger 22 to the nominal voltage in response to detecting the load below the first threshold load.

In some embodiments, the microcontroller 24 is configured to control the charger 22 to charge the battery 20 to either a high voltage or a nominal voltage based on one or more operating parameters. The operating parameters include but are not limited to one or more of load voltage, load current, load power and/or battery temperature.

In a second mode of operation, the microcontroller 24 is configured to operate in a turbo mode of operation in which the lithium-ion battery 20 is charged by the charger 22 to a high voltage at any time based on a user request, even if load on the lithium-ion battery is low. Specifically, the battery charging system is configured to receive a user command to charge the battery 20 to the high voltage, with the high voltage being higher than the nominal voltage. This setting will allow the customer to override the automatic charger voltage setting and select a suitable fixed voltage charging to optimize the backup time irrespective of the load conditions. This feature may be selected through a user interface associated with the UPS.

In some embodiments, the microcontroller 24 is configured to resume controlling the charger 22 to charge the battery 20 to the nominal voltage in response to another user command.

In some embodiments, the microcontroller 24 is configured to control the charger 22 to charge the battery 20 to either a high voltage or a nominal voltage based on one or more operating parameters. The operating parameters include but are not limited to one or more of load voltage, load current, load power and/or battery temperature.

In some embodiments, the microcontroller 24 is configured to output a notification of an increased load powered by the battery 20, with the increased load being above the threshold load. This notification can be visual as on a display associated with the microcontroller 24 or audible as in the form of an alarm and/or can be sent from the UPS 10 over a communication network to a remote use.

In some embodiments, the microcontroller 24 is configured to output a notification of a decreased load powered by the battery 20, with the decreased load being below the threshold load. This notification can be visual as on a display associated with the microcontroller 24 or audible as in the form of an alarm. The notification can include an option to decrease the battery charge voltage.

In a third mode of operation, the microcontroller 24 is configured to operate in a life enhancement mode of operation in which the lithium-ion battery 20 is discharged by the charger 22 based on a low load that is detected or based on a user request. Specifically, the battery charging system is configured to control the charger 22 to charge the battery to the high voltage in response to receiving a user command and to control the charger to discharge the battery to the nominal voltage in response to detecting the load below the threshold load. Thus, if a high voltage is applied to the lithium-ion battery 20 due to previously high load and a low load is subsequently detected, the lithium-ion battery can be discharged automatically to a lower voltage. This may also be performed in accordance to a user request.

Figure 8:
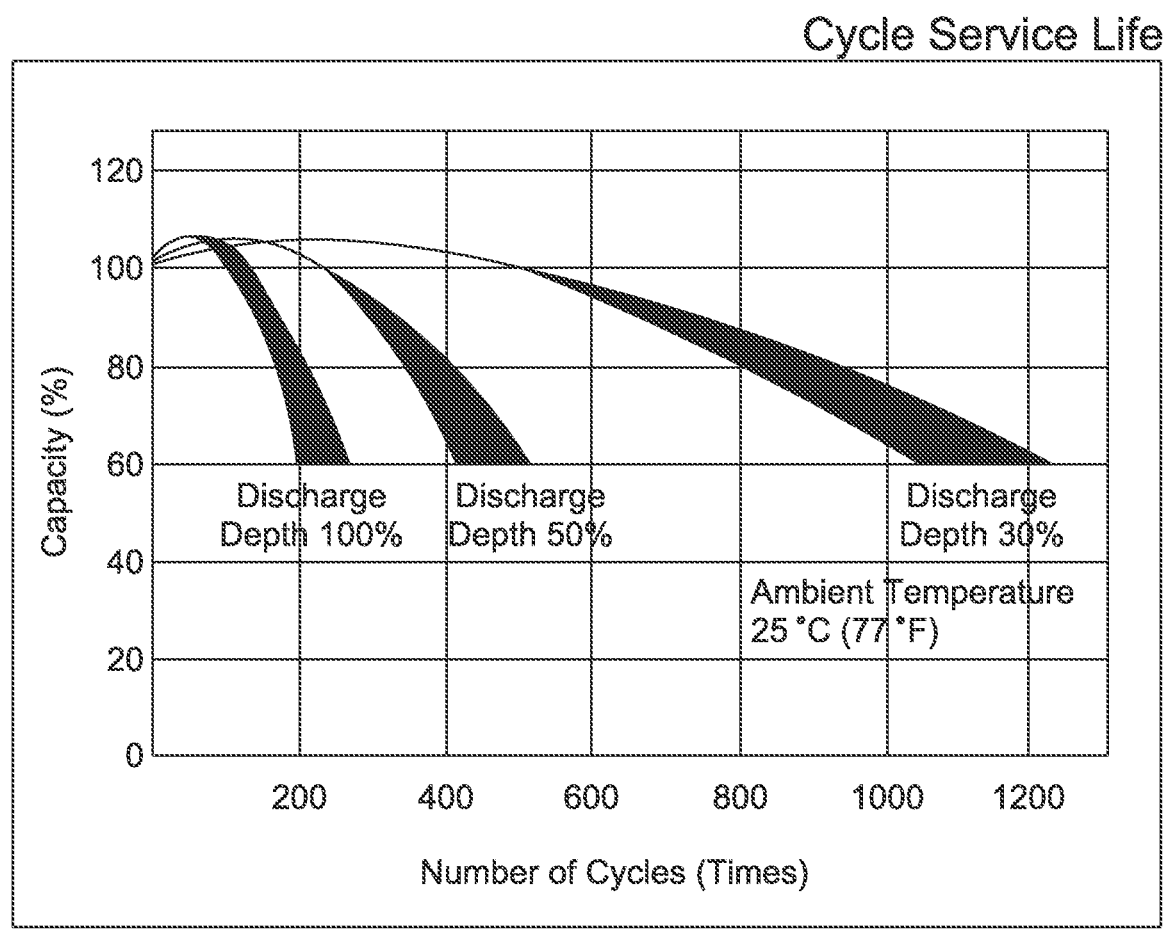
FIG. 8 is a graph showing cycle life of a lead acid battery.

The foregoing systems and methods may also be applied to lead acid batteries by altering certain parameters. FIG. 8 is a graph showing cycle life of a lead acid battery. The life of lead acid batteries is more sensitive to depth of discharge (DOD) than the charging voltage. In one example, the same algorithm may be applied to lead acid battery by introducing the battery cutoff voltage (Vbat_Cutoff) as a variable to control the depth of discharge. The battery cutoff voltage may be defined as a condition at which the battery is disconnected from the load to avoid further discharge. This approach will enhance the life of the lead acid battery.

Figure 9:
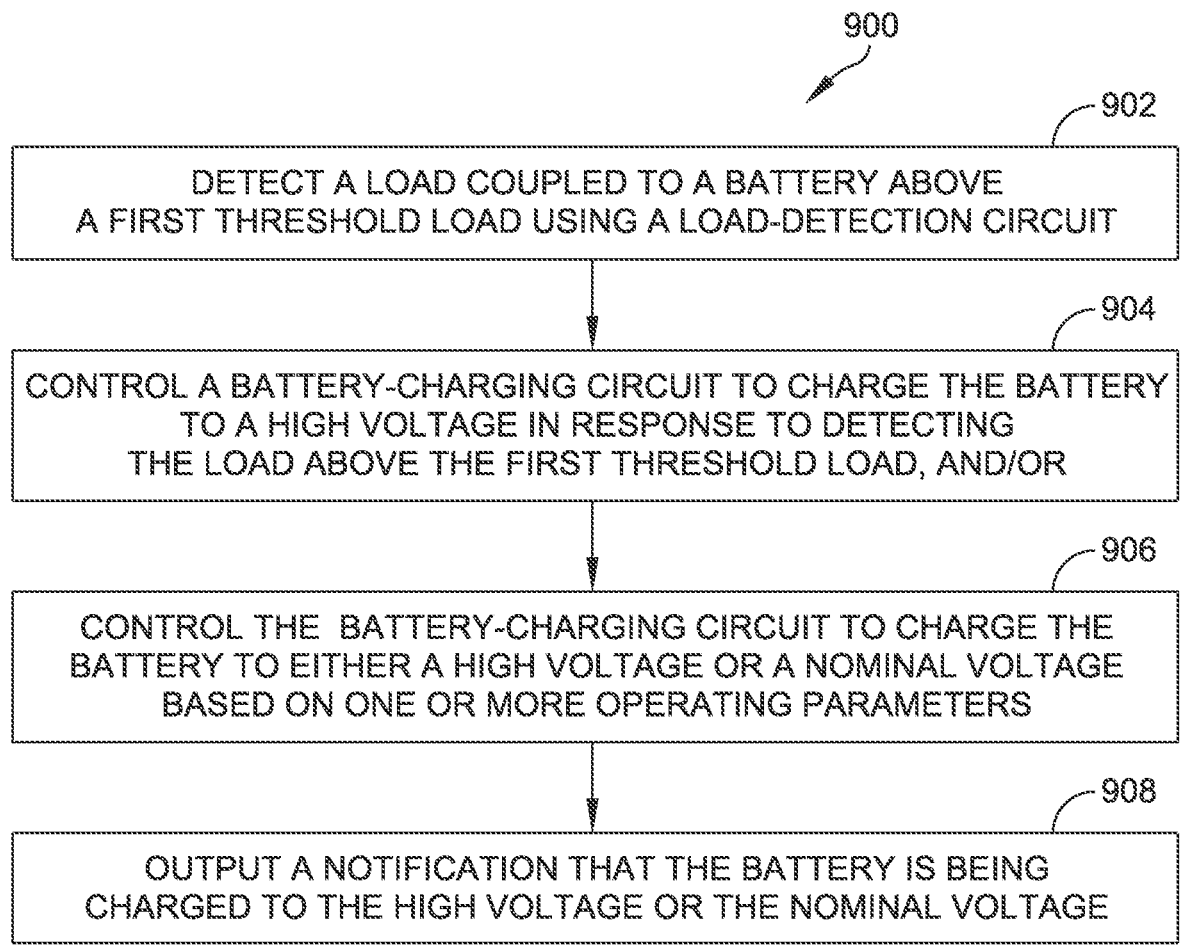
FIG. 9 is a diagram of a method of charging a battery of a device of an embodiment of the present disclosure.

Referring to FIG. 9, a method of charging a battery is generally indicated at 900. As shown, the method 900 includes at 902 detecting a load, such as load 14, coupled to a battery, e.g., battery 20, above a first threshold load using a load detection circuit. The method 900 further includes at 904 controlling a battery-charging circuit to charge the battery 20 to a high voltage in response to detecting the load 14 above the first threshold load, and/or at 906 controlling the battery-charging circuit to charge the battery to either a high voltage or a nominal voltage based on one or more operating parameters. As mentioned above, the charger 22 is configured to charge the battery 20 to the desired voltage. Further, the one or more operating parameters may include at least one of load voltage, load current, load power or battery temperature. The method 900 further includes at 908 outputting a notification that the battery 20 is being charged to the high voltage or the nominal voltage.

Figure 10:
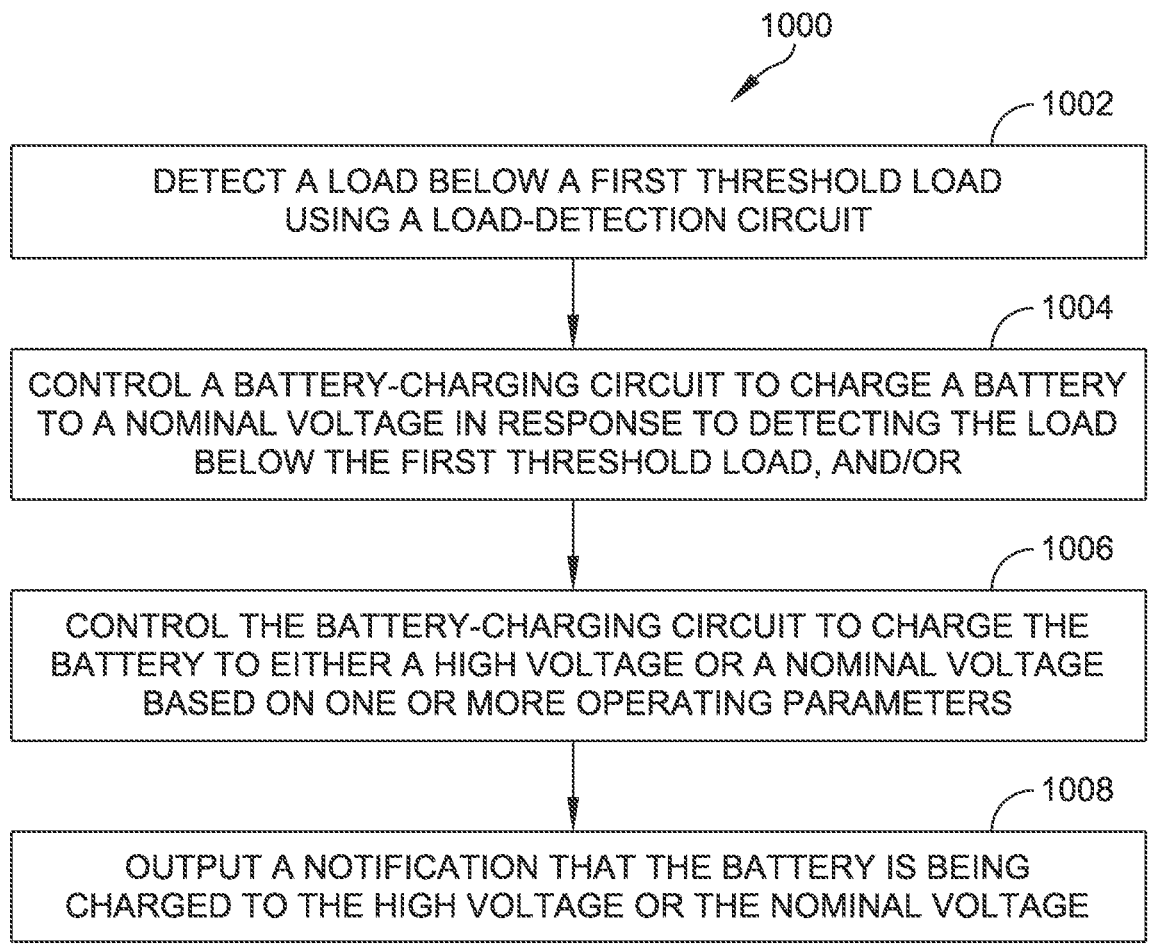
FIG. 10 is a diagram of a method of charging a battery of a device of another embodiment of the present disclosure.

Referring to FIG. 10, a method of charging a battery is generally indicated at 1000. As shown, the method 1000 includes at 1002 detecting a load, such as load 14, below a first threshold load using a load-detection circuit. The method 1000 further includes at 1004 controlling a battery-charging circuit to charge a battery, e.g., battery 20, to a nominal voltage in response to detecting the load 14 below the first threshold load, and/or at 1004 controlling the battery-charging circuit to charge the battery to either a high voltage or a nominal voltage based on one or more operating parameters. As mentioned above, the charger 22 is configured to charge the battery 20 to the desired voltage. Further, the one or more operating parameters may include at least one of load voltage, load current, load power or battery temperature. The method 1000 further includes outputting a notification that the battery is being charged to the high voltage or the nominal voltage.

Figure 11:
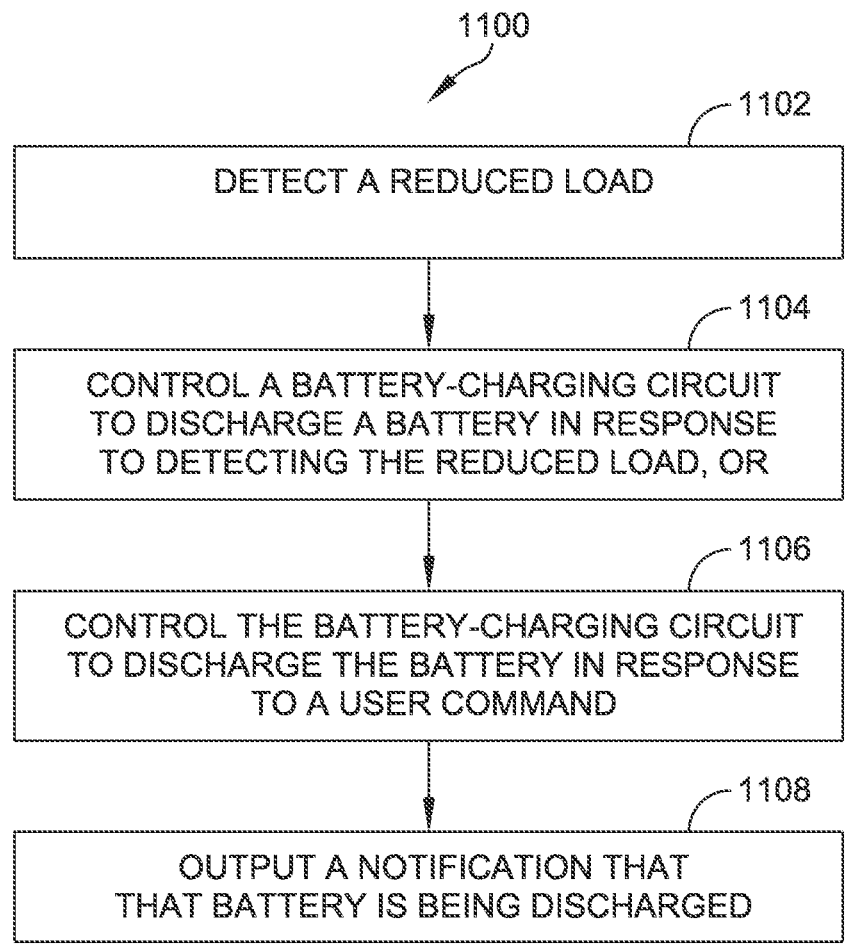
FIG. 11 is a diagram of a method of charging a battery of a device of another embodiment of the present disclosure.

Referring to FIG. 11, a method of charging a battery is generally indicated at 1100. As shown, the method 1100 includes at 1102 detecting a reduced load, such as load 14. The method 1100 further includes at 1104 controlling a battery-charging circuit to discharge a battery, e.g., battery 20, in response to detecting the reduced load 14, and/or at 1106 controlling the battery-charging circuit to discharge the battery in response to a user command. As mentioned above, the charger 22 is configured to discharge the battery 20 to the desired voltage. The method 1100 further includes at 1108 outputting a notification that the battery 20 is being discharged.

Figure 12:
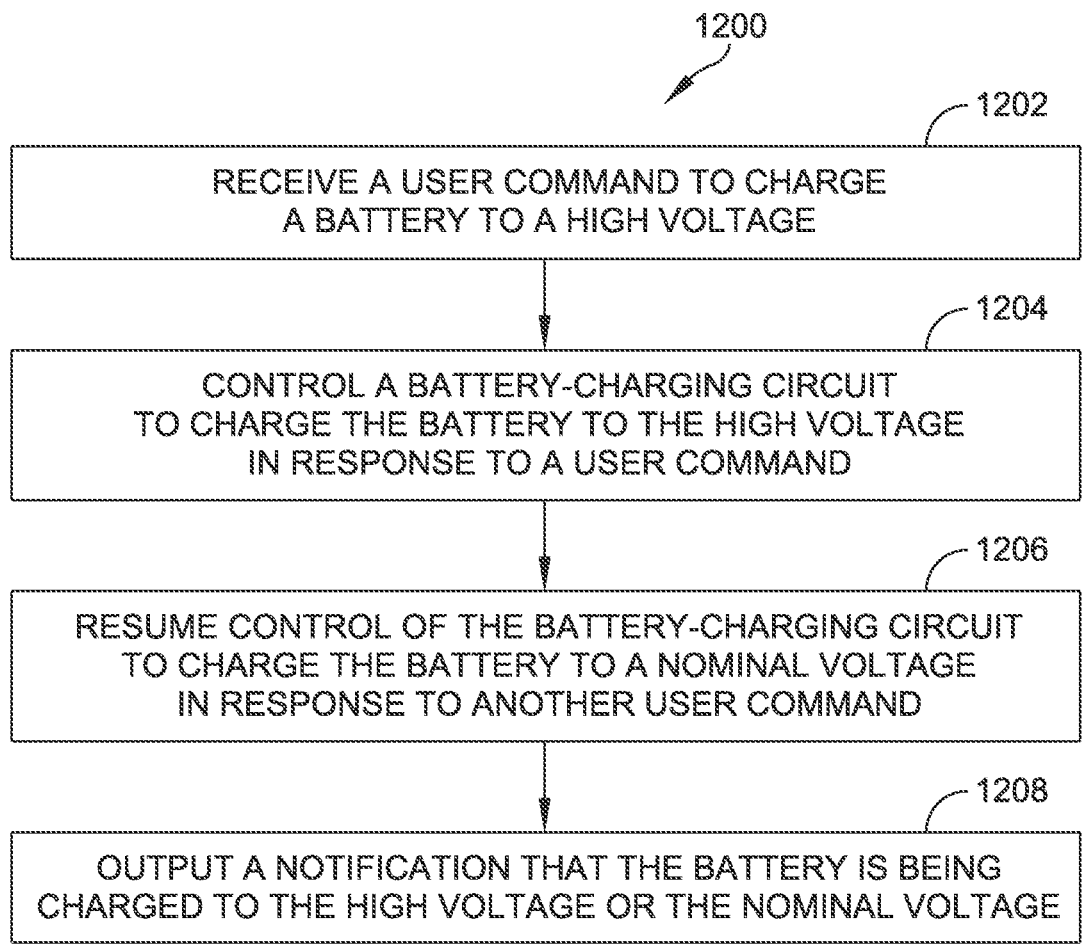
FIG. 12 is a diagram of a method of charging a battery of a device of another embodiment of the present disclosure.

Referring to FIG. 12, a method of charging a battery is generally indicated at 1200. As shown, the method 1200 includes at 1202 receiving a user command to charge a battery, e.g., battery 20, to a high voltage. The method 1200 further includes at 1204 controlling a battery-charging circuit to charge the battery 20 to the high voltage in response to a user command. As mentioned above, the charger 22 is configured to charge the battery 20 to the desired voltage.

The method 1200 further includes at 1206 resume controlling the battery-charging circuit to charge the battery 20 to a nominal voltage in response to another user command. The method 1200 further includes at 1208 outputting a notification that the battery 20 is being charged to the high voltage or the nominal voltage.

Figure 13:
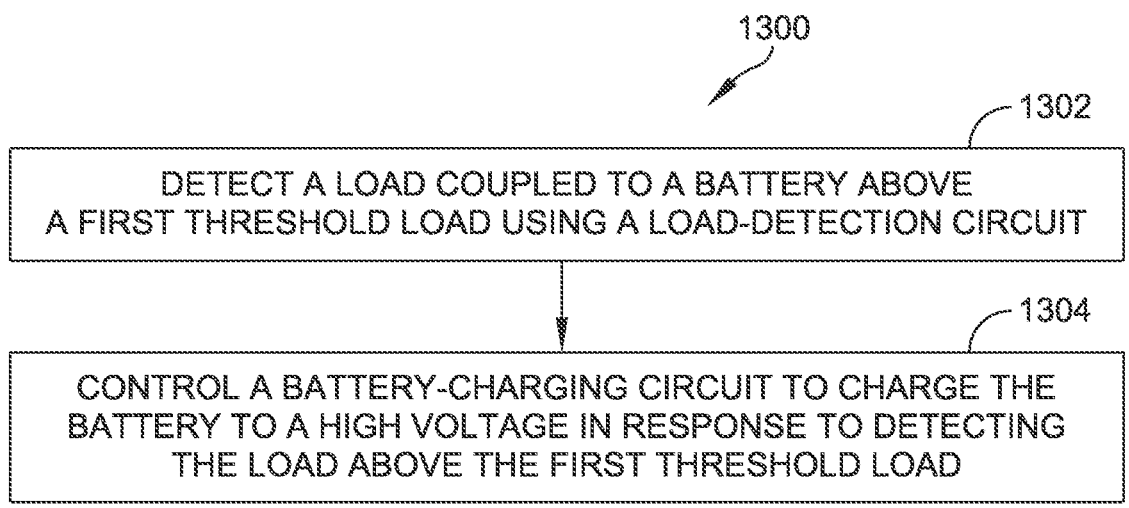
FIG. 13 is a diagram of a method of charging a battery of a device of another embodiment of the present disclosure.

Referring to FIG. 13, a method of charging a battery is generally indicated at 1300. As shown, the method 1300 includes at 1302 detecting a load, such as load 14, coupled to a battery, e.g., battery 20, above a first threshold load using a load detection circuit. The method 1300 further includes at 1304 controlling a battery-charging circuit to charge the battery 20 to a high voltage in response to detecting the load 14 above the first threshold load. As mentioned above, the charger 22 is configured to charge the battery 20 to the desired voltage.

Figure 14:
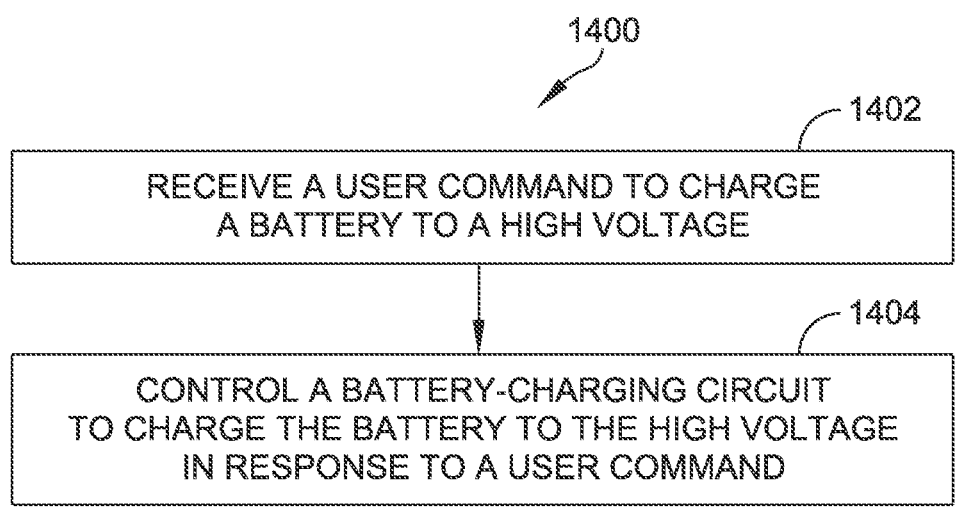
FIG. 14 is a diagram of a method of charging a battery of a device of another embodiment of the present disclosure.

Referring to FIG. 14, a method of charging a battery is generally indicated at 1400. As shown, the method 1400 includes at 1402 receiving a user command to charge a battery, e.g., battery 20, to a high voltage. The method 1400 further includes at 1404 controlling a battery-charging circuit to charge the battery 20 to the high voltage in response to a user command. As mentioned above, the charger 22 is configured to charge the battery 20 to the desired voltage.

Having thus described several aspects of at least one embodiment of this disclosure, it is to be appreciated various alterations, modifications, and improvements can readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A battery-charging system configured to charge a battery of a device to a nominal voltage, the battery-charging system comprising:
    a battery-charging circuit coupled to the battery;
    a load-detection circuit coupled to the device, the load-detection circuit being configured to detect a load powered from the device, the load-detection circuit being located electrically downstream from the battery;
    memory storing controller-executable instructions; and
    a controller configured to execute the instructions, which cause the controller to detect the load above a first threshold load using the load-detection circuit,
    control the battery-charging circuit to charge the battery to a high voltage in response to detecting the load above the first threshold load, wherein the high voltage is above the nominal voltage,
    detect a load below the first threshold load using the load-detection circuit, and
    control the battery-charging circuit to charge the battery to the nominal voltage in response to detecting a load below the first threshold load.

2. The battery-charging system of claim 1, wherein the controller further is configured to output a notification that the battery is being charged to the high voltage.

3. The battery-charging system of claim 1, wherein the controller further is configured to control the battery-charging circuit to discharge the battery in response to a user command.

4. The battery-charging system of claim 1, wherein the controller further is configured to control the battery-charging circuit to discharge the battery in response to detecting a reduced load.

5. The battery-charging system of claim 4, wherein the reduced load is below a second threshold load.

6. The battery-charging system of claim 1, wherein the controller further is configured to control the battery-charging circuit to charge the battery to either the high voltage or the nominal voltage based on one or more operating parameters.

7. The battery-charging system of claim 6, wherein the one or more operating parameters include at least one of load voltage, load current, load power or battery temperature.

8. The battery-charging system of claim 1, wherein the controller further is configured to receive a user command to charge the battery to the high voltage, and
    control the battery-charging circuit to charge the battery to the high voltage in response to the user command to charge the battery to the high voltage.

9. The battery-charging system of claim 8, wherein the controller further is configured to resume controlling the battery-charging circuit to charge the battery to the nominal voltage in response to another user command.

10. The battery-charging system of claim 8, wherein the controller further is configured to output a notification of an increased load coupled to the battery, wherein the increased load is above the first threshold load.

11. The battery-charging system of claim 8, wherein the controller further is configured to output a notification of a decreased load coupled to the battery, wherein the decreased load is below the first threshold load.

12. The battery-charging system of claim 8, wherein the controller further is configured to control the battery-charging circuit to charge the battery to either the high voltage or the nominal voltage based on one or more operating parameters.

13. The battery-charging system of claim 12, wherein the one or more operating parameters include at least one of load voltage, load current, load power or battery temperature.

14. One or more non-transitory machine-readable media storing instructions that, when executed by one or more processors, cause the one or more processors to:
    detect a load, coupled to a battery of a device, above a first threshold load using a load-detection circuit, the load load-detecting circuit being located electrically downstream from the battery;
    control a battery-charging circuit to charge the battery to a high voltage in response to detecting a load above the first threshold load, wherein the high voltage is above a nominal voltage;
    detect a load below the first threshold load using the load-detection circuit, and
    control the battery-charging circuit to charge the battery to the nominal voltage in response to detecting a load below the first threshold load.

15. The one or more non-transitory machine-readable media of claim 14, further storing instructions that, when executed by the one or more processors, cause the one or more processors to:
    control the battery-charging circuit to charge the battery to either the high voltage or the nominal voltage based on one or more operating parameters.

16. The one or more non-transitory machine-readable media of claim 15, wherein the one or more operating parameters include at least one of load voltage, load current, load power or battery temperature.

17. The one or more non-transitory machine-readable media of claim 14, further storing instructions that, when executed by the one or more processors, cause the one or more processors to:
    receive a user command to charge a battery to the high voltage; and control the battery-charging circuit to charge the battery to the high voltage in response to the user command to charge the battery to the high voltage.

18. The one or more non-transitory machine-readable media of claim 17, further storing instructions that, when executed by the one or more processors, cause the one or more processors to:

resume controlling the battery-charging circuit to charge the battery to the nominal voltage in response to another user command.

19. The one or more non-transitory machine readable media of claim 17, further storing instructions that, when executed by the one or more processors, cause the one or more processors to:

output a notification of an increased load coupled to the battery, wherein the increased load is above the first threshold load.

20. The one or more non-transitory machine readable media of claim 17, further storing instructions that, when executed by the one or more processors, cause the one or more processors to:

output a notification of a decreased load coupled to the battery, wherein the decreased load is below the first threshold load.

* * * * *